United States Patent
Yu et al.

(10) Patent No.: US 11,599,692 B2
(45) Date of Patent: Mar. 7, 2023

(54) CALCULATION AND ANALYSIS METHOD OF LIMIT LOAD, DEFORMATION AND ENERGY DISSIPATING OF RING NET PANEL IN FLEXIBLE PROTECTION SYSTEM

(71) Applicants: Southwest Jiaotong University, Chengdu (CN); SOUTHWEST JIAOTONG UNIVERSITY CHENGDU DESIGN INSTITUTE CO., LTD., Chengdu (CN)

(72) Inventors: Zhixiang Yu, Chengdu (CN); Liru Luo, Chengdu (CN); Yuntao Jin, Chengdu (CN); Liping Guo, Chengdu (CN); Hu Xu, Chengdu (CN); Xin Qi, Chengdu (CN); Lei Zhao, Chengdu (CN); Shichun Zhao, Chengdu (CN)

(73) Assignees: SOUTHWEST JIAOTONG UNIVERSITY, Chengdu (CN); SOUTHWEST JIAOTONG UNIVERSITY CHENGDU DESIGN INSTITUTE CO., LTD., Chengdu (CN)

( * ) Notice: Subject to any disclaimer, the term of this patent is extended or adjusted under 35 U.S.C. 154(b) by 149 days.

(21) Appl. No.: 17/023,385

(22) Filed: Sep. 17, 2020

(65) Prior Publication Data
US 2021/0342503 A1    Nov. 4, 2021

(30) Foreign Application Priority Data
Apr. 30, 2020    (CN) .......................... 202010365241.1

(51) Int. Cl.
   *G06F 30/20*    (2020.01)
   *G06F 111/10*    (2020.01)
   (Continued)

(52) U.S. Cl.
   CPC .............. *G06F 30/20* (2020.01); *E01F 7/045* (2013.01); *E02D 17/202* (2013.01); *G06F 2111/10* (2020.01)

(58) Field of Classification Search
CPC ...... G06F 30/20; G06F 2111/10; E01F 7/045; E02D 17/202
See application file for complete search history.

(56) References Cited

U.S. PATENT DOCUMENTS

2019/0345680 A1*   11/2019   Wendeler-Goeggelmann ............. E01F 7/04
2020/0232172 A1*   7/2020   Lanter ..................... E01F 7/045

OTHER PUBLICATIONS

Xu H, Gentilini C, Yu Z, Qi X, Zhao S. An energy allocation based design approach for flexible rockfall protection barriers. Engineering Structures. Oct. 15, 2018;173:831-52. (Year: 2018).*

(Continued)

*Primary Examiner* — Chuen-Meei Gan
(74) *Attorney, Agent, or Firm* — Bayramoglu Law Offices LLC

(57) ABSTRACT

A calculation method of limit load, deformation and energy dissipating of a ring net panel of a flexible protection net, includes step (1): determining geometrical parameters of the ring net, connection type of steel rings, and diameter of steel wires; step (2): determining a loading rate, a loaded region and a boundary condition of the ring net panel; step (3): obtaining basic mechanical parameters of materials through tests, and establishing a critical damage criterion of the ring net panel; step (4): establishing an equivalent calculation model of a ring net panel based on a fiber-spring unit; and step (5): calculating a puncturing displacement, a puncturing load and energy dissipating of the ring net panel. The method adopts a calculation assumption of load path equivalence.

19 Claims, 4 Drawing Sheets

(51) Int. Cl.
    *E01F 7/04*           (2006.01)
    *E02D 17/20*         (2006.01)

(56) References Cited

OTHER PUBLICATIONS

Castanon-Jano L, Blanco-Fernandez E, Castro-Fresno D, Ferreño D. Use of explicit FEM models for the structural and parametrical analysis of rockfall protection barriers. Engineering Structures. Jul. 1, 2018;166:212-26. (Year: 2018).*

Gentilini C, Govoni L, de Miranda S, Gottardi G, Ubertini F. Three-dimensional numerical modelling of falling rock protection barriers. Computers and Geotechnics. Jun. 1, 2012;44:58-72. (Year: 2012).*

Ministry of Communications of the People's Republic of China, Component of flexible system for protecting highway slope-JT/T 528, 2004, pp. 59-69.

Ministry of Railways of the People's Republic of China, The flexible safety net for protection of slope along the line-TB/T 3089, 2004, pp. 1-14.

General Administration of Quality Supervision, Inspection and Quarantine of the People's Republic of China, Forged shackles for general lifting purposes—Dee shackles and bow shackles—GBT 25854, 2010, pp. 1-14.

General Administration of Quality Supervision, Inspection and Quarantine of the People's Republic of China, Aluminium-alloy swaged ferrules for steel wire rope—GB/T 6946-2008, pp. 1-10.

\* cited by examiner

US 11,599,692 B2

CALCULATION AND ANALYSIS METHOD OF LIMIT LOAD, DEFORMATION AND ENERGY DISSIPATING OF RING NET PANEL IN FLEXIBLE PROTECTION SYSTEM

CROSS REFERENCES TO THE RELATED APPLICATIONS

This application is based upon and claims priority to Chinese Patent Application No. 202010365241.1, filed on Apr. 30, 2020, the entire contents of which are incorporated herein by reference.

TECHNICAL FIELD

The present invention relates to a calculation and analysis method of a ring net panel in a flexible protection system, belongs to the field of side slope protection engineering, and more particularly, to a calculation method of limit load, deformation and energy dissipating of the ring net panel of a flexible protection net.

BACKGROUND

Recently, due to the comprehensive influence of human factors such as a man-made slope of road, excessive exploration, etc. and natural factors such as heavy rain, extreme rainfall, etc., geological disasters such as collapse and rockfall, landslide, debris flow, etc. occur frequently in southwest and southeast hilly mountainous regions and northwest regions in China. These situations present significant hidden danger for causing damage to property and person. The flexible protection system, a new interception structure, is commonly applied to the field of geological disaster protection.

The flexible protection system is a complex non-linear structure system composed of a support part (steel column), an interception part (flexible net), an energy dissipating part (decompression ring), a connection part (steel rope, shackle) and an anchor part (base, anchor pole). The flexible interception net is a key part of successfully implementing a safety protection function of the flexible protection system. It bears the direct impact, for example, of falling rocks. Once the net is damaged, the protection system loses its loading and protection function. At present, a rhombic net, a double twisted hexagonal net, a G.T.S net, a ring net and the like are often adopted as interception parts in the flexible protection system.

Compared with other types of nets, the ring net panel has a greater deformation and load bearing ability, which are often applied to a high energy level protection net. The ring net is formed by a loose connection, and thus when the ring panel is subjected to the impact, non-linear characteristics such as strong contact, slippage, damage and the like typically occur. As a result, the design of the flexible protection system has become very complex. Quantitative evaluation for the deformation, loading and energy dissipating abilities is critical for designing the ring net so that its safety protection function is optimal.

At present, the relevant standard with respect to engineering design of the flexible protection system includes only two industry standards, that is, "The flexible safety net for protection of slope along the line" (TB/T3089-2004) and "Component of flexible system for protecting highway slope" (JT/T 528-2004) in China. In the two industry standards, products, such as the steel rope, shackle, decompression ring and the like, are inspected by the inspection methods and requirements under a static condition. However, the evaluation method is simple, and a comprehensive evaluation index with respect to safety performances such as deformation, loading, energy dissipating and the like of the ring net panel is not considered by the current method either. Therefore, it is difficult to ensure a reasonable and competent selection and engineering design for the interception part in the practical engineering. The net panel is considered as a portion of the force transmission parts of the system, and a type and size of the ring net panel are designed according to the limited test result, which cannot perform quantitative calculation for out-of-plane deformation, loading and energy dissipating abilities of the ring net panel to formulate the basis of a reliable design.

The deformation ability of the ring net panel depends on a loose connection and a non-linear deformation between net rings. These are important for guaranteeing formation of an optimal buffering ability of the flexible protection system. Compared with a rigid structure, large deformation of the flexible net on impact significantly prolongs the duration time of impact. This effectively reduces the impact force peak, thereby reducing internal forces of other parts such as the steel column, support rope and the like in the system reducing the degree of damage to the protection system. The loading ability of the ring net panel depends on the material strength of a high-strength steel rope and the number of winding turns of a net ring.

The loading ability is also influenced by factors such as the number of strands of the steel rope, an area of the loaded region, boundary constraint and the like. The loading ability of the ring panel is a key index indicating whether the interception function can be implemented. The energy dissipating ability of the ring net panel depends on a common result of the deformation ability and the loading ability, which is matched with a protection level index of the flexible protection system, and adapted to a design method based on energy matching in the design of the protection system. The deformation, loading and energy dissipating abilities of the ring net panel together form the comprehensive evaluation index of the safety of the interception parts of the protection system. In the practical engineering, a quantitative analysis method of performance evaluation of the ring net panel is established to ensure a reliable design of the protection net, which is significant to improve the interception effect for geological disasters such as rockfalls, landslides, debris flows, etc. and reduce losses of the disasters. Thus, an improved quantitative analysis method of performance evaluation of the ring panel is highly desirable.

SUMMARY

The objective of the present invention is to provide a calculation method of limit load, deformation and energy dissipating of a ring net panel of a flexible protection net that is capable of solving the existing problem that the safety performance evaluation and the design selection of the interception net panel in the flexible protection net system lack a quantitative description method for guaranteeing that the interception net panel of the protection net may achieve the protection ability required by its design.

The above purpose of the present invention is implemented through the following technical solutions:

The calculation method of the limit load, deformation and energy dissipating of the ring net panel of the flexible protection net includes the following steps:

Step (1): determining geometrical parameters of the ring net panel, a nested net ring and a wound steel rope.

The ring net panel is connected to a support part having a protection structure through a shackle and the steel rope, and is manufactured by nesting single rings, an inner diameter of the single ring is d. Each single ring is manufactured by winding the steel rope having a diameter of $d_{min}$, to form different numbers of turns $n_w$, and a cross-sectional area of the single ring is A $$A = \frac{n_w \pi d_{min}^2}{4}$$

The ring net panel has a length $w_x$ and a width $w_y$, a four-nested-into-one ring net panel is formed by using a minimum steel rope having a total length of $l_{wire}$ $$l_{wire} = \frac{n_w \pi d}{2\sqrt{2}\,d}[(w_x - d + 2\sqrt{2}\,d)(w_y - d + 2\sqrt{2}\,d) + (w_x - d)(w_y - d)];$$

The four-nested-into-one ring net panel is formed by a minimum steel rope having a total mass of $m_{wire}$ $$m_{wire} = \frac{\rho \pi d_{min}^2 l_{wire}}{4}$$

Step (2): establishing an equivalent calculation model of the ring net panel based on a fiber-spring unit.

Selecting a Cartesian coordinate system as a standard coordinate system of the model, wherein h is a rising height of an edge of the loading heading end. The net ring in the loaded region presents a rectangular shape after the deformation, and wherein $a_x$ is a side length in an x direction, $a_y$ is a side length in a y direction, and axial deformation of the net ring is ignored, then $$\begin{cases} a_1 + a_2 = \pi d/2 \\ a_1/a_2 = w_2/w_1 \end{cases};$$

the calculation model presents a biaxial symmetry. The net ring at the loaded region is straightened and intersects with an edge of the heading end having a spherical crown shape, a side length of the ring net panel in a positive half axis direction of an axis x is $w_x$, intersection points at intervals of $a_x$ are marked as $P_1, P_2 \ldots P_i \ldots P_m$, and intersection points at intervals of $w_x(2m+1)$ of the corresponding boundary are marked as $Q_1, Q_2 \ldots Q_i \ldots Q_m$, and at any moment. A coordinate of a point $P_i$ of an edge of the loaded region is:

$$\begin{cases} x_P[i] = a_x(i - 1/2) \\ y_P[i] = \sqrt{R_P^2 - a_x^2(i - 1/2)^2} \\ z_P[i] = z \end{cases} \text{ and } \begin{cases} x_P[i] \geq 0 \\ y_P[i] \geq 0 \\ z_P[i] \geq 0 \end{cases};$$

a coordinate of a point $Q_i$ at the boundary may be represented as:

$$\begin{cases} x_Q[i] = w_x(i - 1/2)/(2m_x + 1) \\ y_Q[i] = w_y/2 \\ z_Q[i] = 0 \end{cases} \text{ and } \begin{cases} x_Q[i] \geq 0 \\ y_Q[i] \geq 0 \\ z_Q[i] \geq 0 \end{cases};$$

wherein i=1, 2, . . . m, a calculation formula of an upper limit m taken by i is $$m = \text{round}\left(\frac{R_p}{a_1}\right)$$

A position vector direction of a fiber-spring unit connecting the two points $P_i$ and $Q_i$ may be represented as an equation $$PQ = (x_Q[i] - x_P[i], y_Q[i] - y_P[i], -z)$$

in the loading process, a length value of each fiber-spring unit:

$$L[i] = |PQ|, L_0[i] = |PQ|_{z=0}$$

wherein $L_0[i]$ is an initial length of the unit;

at any moment, a fiber length $l_f$ and a spring length i, in the unit respectively are:

(a) $0 < \gamma_N \leq \gamma_{N1}$ $$\begin{cases} l_s[i] = \frac{E_{f1}A(L[i] - l_{f0}[i]) + k_s l_{s0} l_{f0}[i]}{k_s l_{f0}[i] + E_{f1}A} \\ l_f[i] = \frac{k_s l_{f0}[i](L[i] - l_{s0}) + E_{f1}A l_{f0}[i]}{k_s l_{f0}[i] + E_{f1}A} \end{cases};$$

(b) $\gamma_{N1} < \gamma_N \leq \gamma_{N2}$ $$\begin{cases} l_s[i] = \frac{E_{f2}A/l_{f0}[i](L[i] - l_{f1}[i]) + k_s l_{s1}[i]}{k_s + E_{f2}A/l_{f0}[i]} \\ l_f[i] = \frac{k_s(L[i] - l_{s1}[i]) + l_{f1}[i]E_{f2}A/l_{f0}[i]}{k_s + E_{f2}A/l_{f0}[i]} \end{cases};$$

wherein $l_{f1}$ and $l_{s1}$ respectively are the fiber and spring lengths when $\gamma_N = \gamma_{N1}$;

at any moment, an internal force value of the $i^{th}$ fiber-spring unit $$F[i] = \begin{cases} K_1[i](L[i] - L_0[i]), & 0 < \gamma_N \leq \gamma_{N1} \\ K_1[i](L_1[i] - L_0[i]) + K_2[i](L[i] - L_1[i]), & \gamma_{N1} < \gamma_N \leq \gamma_{N2} \end{cases};$$

at any moment, an energy value of the $i^{th}$ fiber-spring unit dissipated in the loading process $$E[i] = \begin{cases} K_1[i](L[i] - L_0[i])^2/2, & 0 < \gamma_N \leq \gamma_{N1} \\ K_1 L[i](L_1[i] - L_0[i]) + K_1(L_0^2[i] - L_1^2[i])/ \\ \quad 2 + K_2(L[i] - L_1[i])^2/2 \end{cases}, \gamma_{N1} < \gamma_N \leq \gamma_{N2};$$

A length of the ring net panel in a positive half axis of an axis y is marked as $w_y$, intersection points at intervals of $w_y/(2n+1)$ are marked as $C_1, C_2 \ldots C_j \ldots C_n$, intersection points of the corresponding boundary are marked as $D_1$, $D_2 \ldots D_j \ldots D_n$. Similarly, coordinates of points $C_j$ and $D_j$ of the edge of the loaded region, a total length $L[j]$ of the unit, an internal force value $F[j]$ of each unit, and energy dissipating $E[j]$ at any moment may all be obtained from symmetry.

Step (3): calculating a puncturing displacement. A puncturing load and energy dissipating of the ring net panel In the displacement loading process of the ring net panel, when an invalidation occurs in any fiber-spring unit of the calculation model, the net is deemed to be damaged, that is, a condition that the damage occurs in the ring net panel is:

$$\max\{|F[i]|, |F[j]|\} = \frac{\gamma_{Nmax}\sigma_y n_w \pi d_{min}^2}{4}.$$

Further, after step (1), the calculation method further includes:

Step (A): determining a loading rate, a loaded region and a boundary condition of the ring net panel.

according to the geometrical parameters of the ring net panel in step (1), further determining whether the loading rate applied to the ring net panel satisfies a quasi-static loading requirement;

judging whether a size of the loaded region satisfies a protection condition; and judging that the boundary of the ring net panel is a hinged boundary or an elastic boundary.

Further, the loading rate in the step (A) refers to a moving speed of a loading heading end having a spherical crown shape in a direction vertical to a net surface of the ring net panel, and the loading rate needs to satisfy a quasi-static condition, that is, a vertical loading speed is smaller than 10 mm/s;

The loaded region refers to a region where direct contact occurs between the heading end having a spherical crown shape and the ring net panel, and a size of the loaded region needs to satisfy the protection condition, that is, a diameter D of a maximum loaded region needs to be smaller than ⅓ of a size of the ring net panel in the shortest direction Minimum$\{w_x, w_y\}$;

The boundary of the ring net panel may be divided into the hinged boundary or the elastic boundary. If it is the elastic boundary, an equivalent stiffness of the boundary is $k_s$=const, and if it is the hinged boundary, an equivalent stiffness of the boundary is $k_s = \infty$.

Further, after step (A), the calculation method further includes:

step (B): obtaining basic mechanical parameters of materials through tests, and establishing a critical damage criterion of the ring net panel.

Selecting the steel rope and a steel rope net ring consistent with the geometrical parameters in step (1) to respectively conduct a tensile test of the steel rope and a breaking test of a three-ring ring chain. Obtaining a stress-strain curve of a material of the ring net panel through the test of the steel rope, to extract material parameters such as an elastic modulus E, a yield strength $\sigma_y$, an ultimate strength $\sigma_b$, a maximum plastic strain $\varepsilon^p$, etc. Obtaining a tension-displacement curve of a ring chain through the test of the ring chain, to extract an initial length $l_{N0}$ of the ring chain, a length $l_{N1}$ at a bent boundary moment, a tension $F_{N1}$, an axial stress $\sigma_{N1}$, a development degree of the axial stress $\gamma_{N1}$, a length $l_{N2}$ at a breaking moment, a tension $F_{N2}$, an axial stress $\sigma_{N2}$, and a development degree of the axial stress $\gamma_{N2}$.

Obtaining the damage criterion when puncturing occurs in the ring net panel, that is, the development degree of the maximum axial stress of the net ring in a force transmission path of the edge of the loaded region of the ring net panel is as follows:

$$\gamma_{Nmax} = \gamma_{N2} = \frac{\sigma_{N2}}{\sigma_y} = \frac{F_{N2}}{(2\sigma_y A)}.$$

Further, step (3) further includes:

when a rising height of the heading end is z, as i increases (i=1, 2, 3, . . . ), the initial length $L_0[i]$ of the fiber-spring unit increases, while the axial force $F[i]$ of the fiber-spring unit reduces, that is, $$L_0[i] < L_0[i+1] \Rightarrow F[i+1] < F[i]$$

a unit having a minimum length in the model is $$L_0|_{i=1} = \min\{L_0[i], L_0[j]\}$$

that is, as for loading the displacement outside a specific surface, the internal force of the unit (i=1) develops fastest, and the unit (i=1) is first damaged $$F|_{i=1} = \gamma_{N2}\sigma_y A$$

Thus, the length of the first damaged unit is $$L_{max}|_{i=1} = L_0 + \sigma_y A\left(\frac{\gamma_{N1}}{K_1|_{i=1}} + \frac{\gamma_{N2} - \gamma_{N1}}{K_2|_{i=1}}\right);$$

a length $L_0$ of the fiber-spring unit at a moment of z=0, a length $L_{max}$ of the unit at a moment of z=H and a height H of the loaded region at this time form a right triangle, it is obtained according to the Pythagorean theorem that the puncturing displacement is $$H = z = \sqrt{L_{max}^2|_{i=1} - L_0^2|_{i=1}}$$

vectors F[i] and F[j] of the internal force of the fiber-spring unit in x and y directions and energy E[i] and E[j] dissipated by the unit may be obtained through the symmetry, projecting all force vectors toward a vertical direction, and considering the symmetry, a puncturing force of the ring net panel is obtained:

$$F = 4\left\{\sum_{i=1}^{m}\frac{F[i]h}{L[i]} + \sum_{j=1}^{n}\frac{F[j]h}{L[j]}\right\}$$

all energy dissipated by the fiber-spring unit are accumulated to obtain the dissipated energy of the ring net:

$$E = 4\{\Sigma_{i=1}^{m}E[i] + \Sigma_{j=1}^{n}E[j]\}.$$

Further, the equivalent calculation model of the ring net panel based on the fiber-spring unit established in the step (2) is biaxial symmetrical. A ¼ model is considered to perform calculation and analysis. The net ring at the loaded region is straightened and intersects with an edge of the heading end having a spherical crown shape. A side length of the ring net panel in a positive half axis direction of the axis x is $w_x$, intersection points at intervals of $a_x$ are marked as $P_1, P_2 \ldots P_i \ldots P_m$, and intersection points at intervals of $w_x/(2m+1)$ of the corresponding boundary are marked as $Q_1, Q_2 \ldots Q_i \ldots Q_m$, and at any moment. A coordinate of the point $P_i$ of the edge of the loaded region is:

$$\begin{cases} x_P[i] = a_x(i-1/2) \\ y_P[i] = \sqrt{R_P^2 - a_x^2(i-1/2)^2} \\ z_P[i] = z \end{cases} \text{ and } \begin{cases} x_P[i] \geq 0 \\ y_P[i] \geq 0 \\ z_P[i] \geq 0 \end{cases}$$

a coordinate of a point $Q_i$ at the boundary may be represented as:

$$\begin{cases} x_Q[i] = w_x(i-1/2)/(2m_x+1) \\ y_Q[i] = w_y/2 \\ z_Q[i] = 0 \end{cases} \text{ and } \begin{cases} x_Q[i] \geq 0 \\ y_Q[i] \geq 0 \\ z_Q[i] \geq 0 \end{cases}$$

wherein i=1, 2, ... m, a calculation formula of an upper limit m taken by i is $$m = \text{round}\left(\frac{R_P}{a_1}\right)$$

Since the calculation model is biaxial, the internal force and deformation of the fiber-spring unit contained in the remaining ¾ of the ring net panel may both be similarly obtained in conjunction with step (3).

Further, the puncturing displacement of the ring net panel in the step (3) refers to a difference between a height from the ground at a moment when the loading heading end having a spherical crown shape initially contacts the ring net panel and a height at a moment when the puncturing damage occurs. The puncturing displacement depends on the deformation of the fiber-spring unit in the shortest force transmission path of the ring net panel when the breaking occurs, and the equation of the puncturing displacement is:

$$H = z = \sqrt{L_{max}^2|_{i=1} - L_0^2|_{i=1}}$$

Further, the out-of-plane puncturing force of the ring net panel in the step (3) refers to the projected accumulation values of all vectors of the internal force of the fiber-spring unit in the loading direction when the heading end having the spherical crown shape loads the ring net panel and the puncturing damage occurs, and the equation is:

$$F = 4\left\{\sum_{i=1}^{m}\frac{F[i]h}{L[i]} + \sum_{j=1}^{n}\frac{F[j]h}{L[j]}\right\}.$$

Further, the energy dissipated by the ring net panel in the step (3) refers to a sum of work done by all vectors of the internal force of the fiber-spring unit in respective directions during the process that the heading end having the spherical crown shape loads the ring net panel at the initial moment, until the puncturing damage occurs in the ring net panel, and the equation is:

$$E = 4\{\Sigma_{i=1}^{m} E[i] + \Sigma_{j=1}^{n} E[j]\}.$$

Further, the high-strength steel rope in the step (1) is a basic material of manufacturing the ring net panel, a surface is plated with anti-corrosion coating, and a diameter $d_{min}$ is 2 mm-3 mm; the high-strength steel rope is formed to a single steel rope net ring having an inner diameter of d after winding a mold a certain number of turns, and the net ring is a basic unit of the ring net panel. The ring net panel is formed by nesting a large number of single rings in a four-nested-into-one mode, and an external contour of the ring net panel presents a rectangle.

Compared with the prior art, the advantages of the present invention are:

(1) the present invention firstly provides an analysis and calculation method of the key interception part (the ring net panel) in a passive flexible protection system under the influence of various factors, deduces the calculation formulas of the ultimate deformation, limit load and ultimate energy dissipating when the puncturing damage occurs in the ring net panel, which is a great supplement and improvement for the existing analysis and calculation technology of the flexible protection.

(2) The basic mechanical parameter is obtained according to the uniaxial tensile test of the steel rope material of the ring net panel, the development degree of the axial stress of the ring net panel in the shortest force transmission path is obtained through the breaking test of the three-ring ring chain and the damage criterion of the ring net is determined, thereby guaranteeing the accuracy of parameter values of the calculation model and the reliability of the calculation result of the model.

(3) Based on the load path equivalence principle, the force characteristic and the damage mechanism of the ring net panel under the ultimate state are specified, a three-dimensional load path equivalent mechanical model is established, thereby implementing a cross section equivalence of the steel rope, a vector equivalence of the force transmission and a region equivalence of the puncturing, which complies with the practical damage criterion. Moreover, it is feasible in an engineering application.

(4) The calculation formulas of the ultimate deformation, load and energy dissipating of the ring net panel are all vector operations, which is suitable for program implementation, and benefits for simultaneously analyzing and calculating ultimate performances of the ring net panel under the influence of various factors. The implementation process has high efficiency and accuracy.

(5) The calculation efficiency of the non-linear analysis of the ring net panel is improved, and an analysis difficulty is reduced, thereby facilitating the calculation and analysis for the interception parts in the flexible protection system.

BRIEF DESCRIPTION OF THE DRAWINGS

In order to explain the technical solutions in embodiments of the present invention or the prior art more clearly, a brief description of the drawings for the embodiments or the prior art is presented below. It should be noted that the following drawings are some embodiments of the present invention, and those ordinary technical persons skilled in the art, on the premise that no creative effort is exerted, may also obtain other drawings according to these drawings.

DETAILED DESCRIPTION OF THE EMBODIMENTS

In order to clearly illustrate the purpose, technical solutions and advantages of embodiments of the present invention, the technical solutions in the embodiments of the present invention will be described clearly and completely below in conjunction with the drawings in the embodiments of the present invention, and obviously, the described embodiments are a part of embodiments of the present invention, rather than the entire embodiments. Based on the embodiments of the present invention, all the other embodiments obtained by those ordinary technical persons in the art on the premise that no creative effort is exerted, belong to scopes protected by the present invention.

Figure 1:
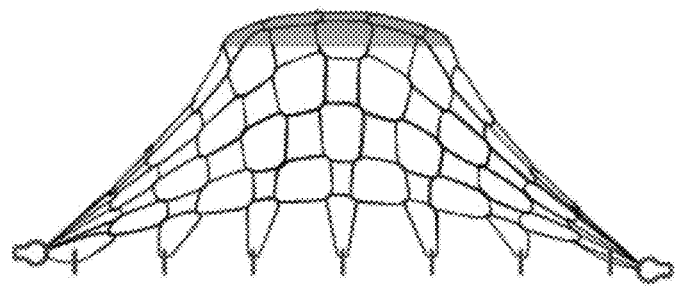
FIG. 1 shows a puncturing ultimate state of a ring net panel according to a calculation method of limit load, deformation and energy dissipating of the ring net panel of a flexible protection net in the present application.

The analysis and calculation implementation process of the present invention is specifically explained below in conjunction with the mechanical model which adopts the calculation method of the present invention. The ultimate deformation, loading and energy dissipating abilities of the ring net panel under loading of the out-of-plane quasi-static state at the shackle boundary as shown in FIG. 1 are calculated by adopting the present invention.

As shown in FIGS. 1-7, specific processes of the calculation method of the limit load, deformation and energy dissipating of the ring net panel of the present invention are as follows:

Step (1): geometrical parameters of the ring net panel, a nested net ring, and a wound steel rope are determined.

A side length of a square ring net panel is $w_0=3.0$ m, an inner diameter of the net ring in the ring net panel is $d=300$ mm, and each net ring is formed by winding the steel rope having a diameter of $d_{min}=3.0$ mm and $n_w=7$ turns. The boundary of the ring net panel adopts a shackle to hinge, and an equivalent boundary rigidity is $k_s=\infty$. The loaded region of the ring net panel is circular, a diameter of a loading apparatus is $D=1.0$ m, the loaded position is located at a geometrical center of the ring net panel, and a loading direction is vertical to a net surface direction.

A cross-section area of the single net ring is A $$A = \frac{7\pi \times 0.003^2}{4} = 4.948 \times 10^{-5} m^2$$

The ring net panel (nesting mode: four-nested-into-one) is formed by a minimum steel rope having a total length of $l_{wire}$ $$l_{wire} = \frac{7\pi \times 0.3}{2\sqrt{2} \times 0.3}\left[(3-0.3+2\sqrt{2}\times 0.3)^2 + (3-0.3)^2\right] = 145.02 m$$

The ring net panel (nesting mode: four-nested-into-one) is formed by a minimum steel rope having a total mass of $m_{wire}$ $$m_{wire} = \frac{7850 \times \pi \times 0.003^2 \times 145.02}{4} = 8.05 \text{ kg}$$

Step (A): a loading rate, a loaded region and a boundary condition of the ring net panel are determined.

According to the geometrical parameters of the ring net panel in step (1), the loading rate of $v=7$ min/s<10 mm/s applied to the ring net panel is further determined, which satisfies a quasi-static loading condition. The diameter of the maximum loaded region is $D=1.0$ m$\leq w_0/3$, which satisfies a safety protection requirement. The boundary equivalent spring rigidity of the ring net panel is $k_s=\infty$, and an initial length of the spring is $l_{s0}=0.05$ m.

Step (B): basic mechanical parameters of materials are obtained through tests, and a critical damage criterion of the ring net panel is established.

Figure 2:
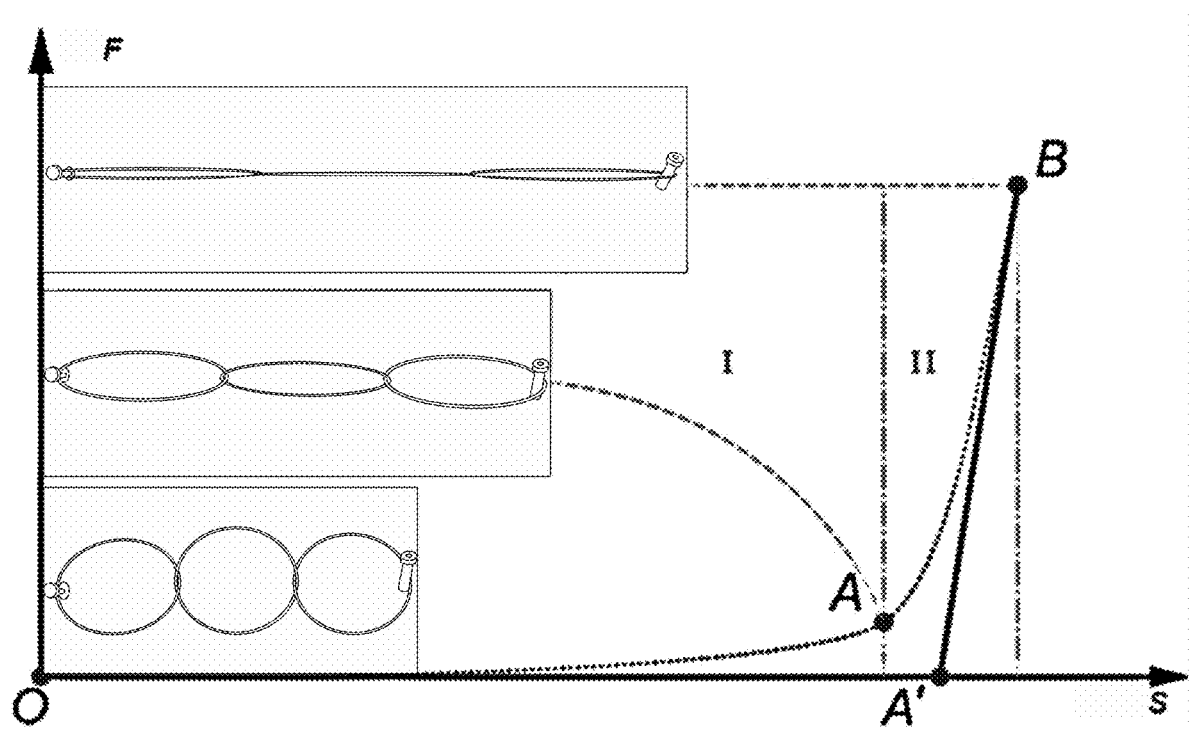
FIG. 2 shows a typical force-displacement curve in a tension state of a ring chain according to the calculation method of limit load, deformation and energy dissipating of the ring net panel of the flexible protection net in the present application.
Figure 3:
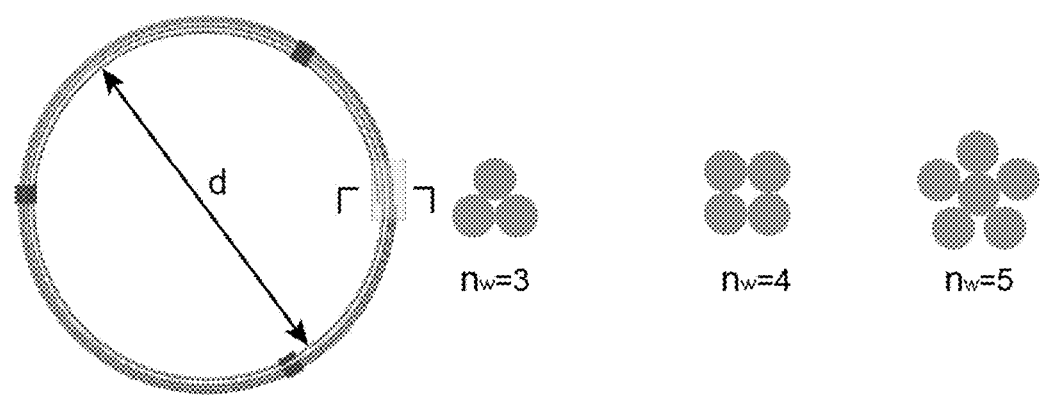
FIG. 3 shows a cross-section of a single ring according to the calculation method of limit load, deformation and energy dissipating of the ring net panel of the flexible protection net in the present application.
Figure 4:
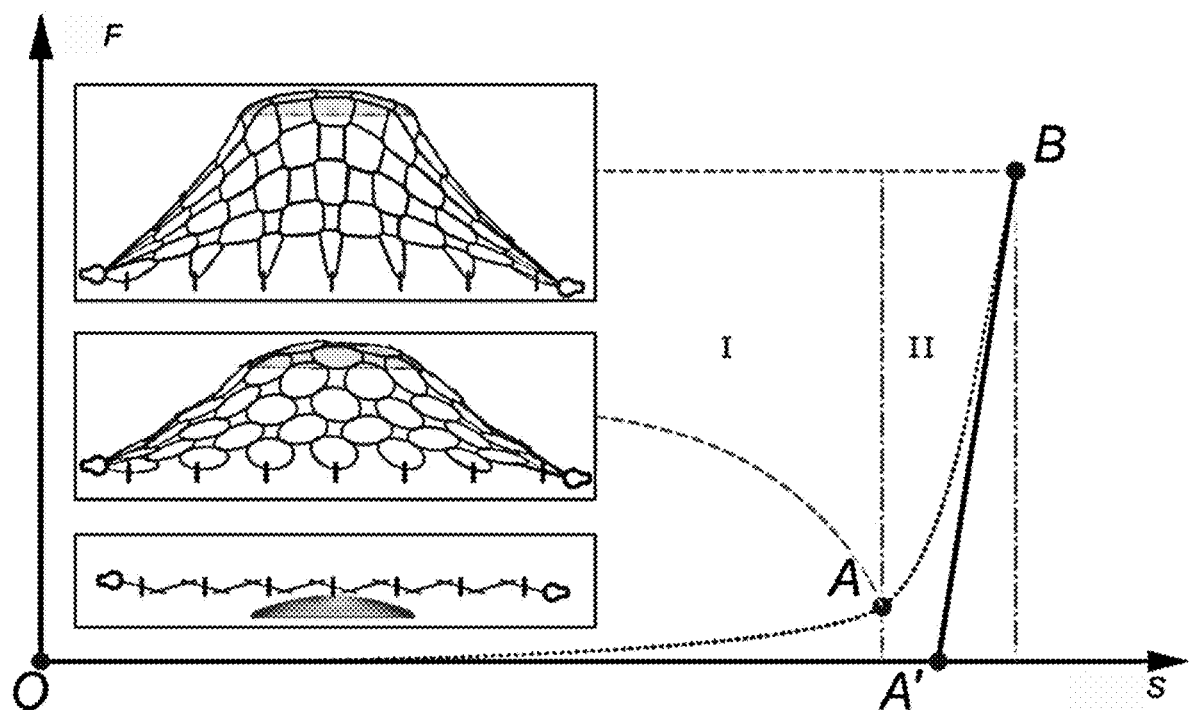
FIG. 4 shows a typical force-displacement curve in a puncturing process of the ring net panel according to the calculation method of limit load, deformation and energy dissipating of the ring net panel of the flexible protection net in the present application.
Figure 5:
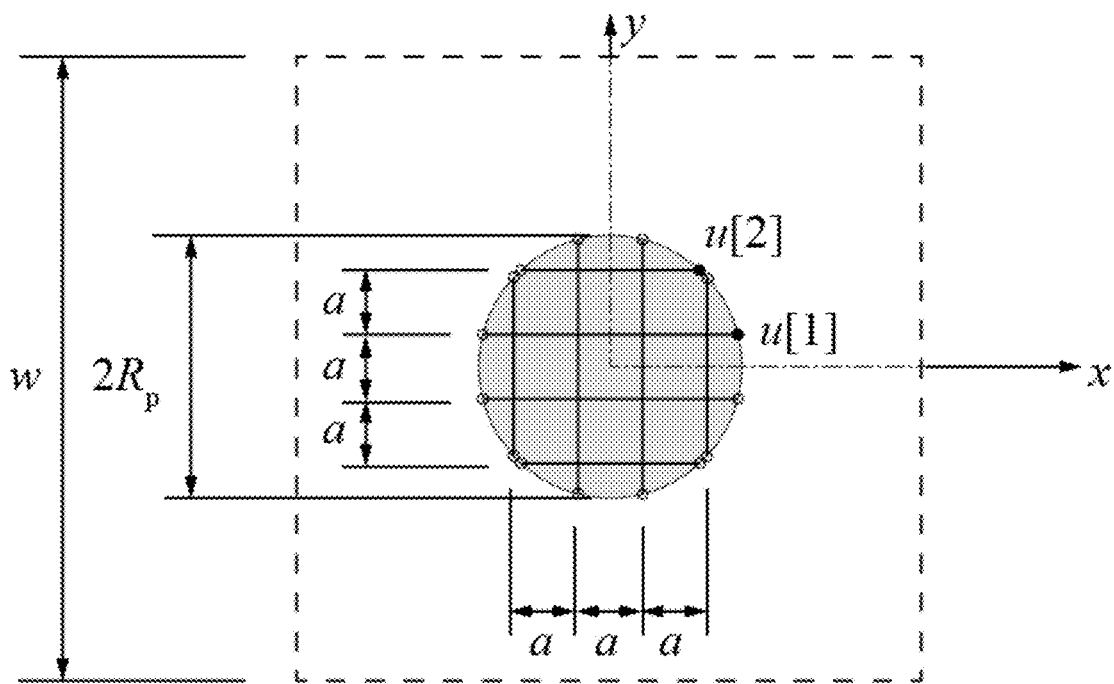
FIG. 5 shows the number of force vectors of a loaded region according to the calculation method of limit load, deformation and energy dissipating of the ring net panel of the flexible protection net in the present application.
Figure 6:
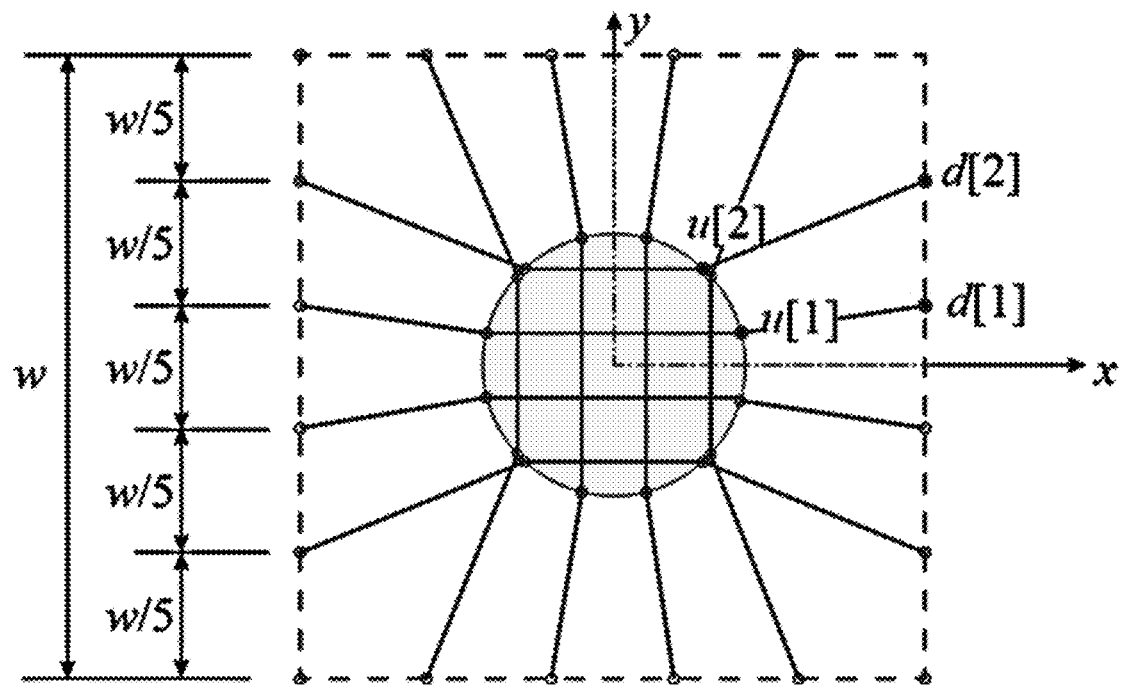
FIG. 6 is a top view of a calculation model of the ring net panel according to the calculation method of limit load, deformation and energy dissipating of the ring net panel of the flexible protection net in the present application.
Figure 7:
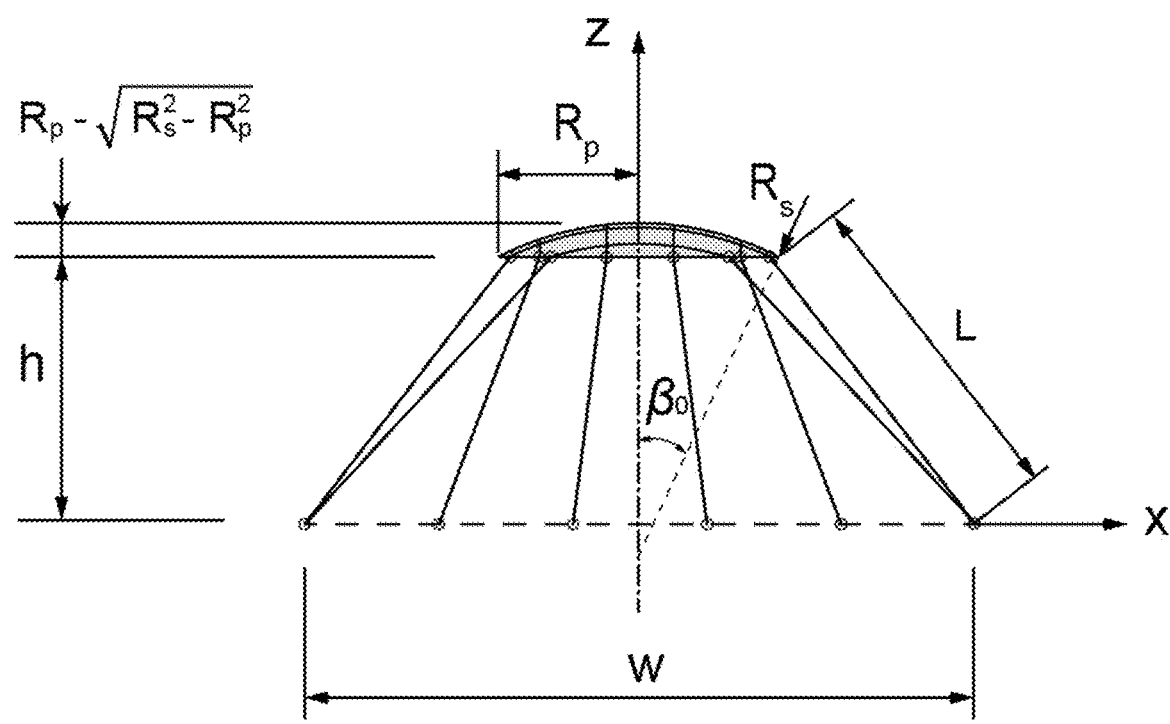
FIG. 7 is a main view of a calculation model of the ring net panel according to a calculation method of limit load, deformation and energy dissipating of the ring net panel of the flexible protection net in the present application.

The steel rope (a diameter is $d_{min}=3.0$ mm) and a steel rope net ring (the winding number of turns of the steel rope is $n_w=7$, an inner diameter of the net ring is $d=0.3$ m) consistent with the geometrical parameters in step (1) are selected to respectively conduct a tensile test of the steel rope and a breaking test of a three-ring ring chain. A stress-strain curve of the ring net panel material is obtained through the test of the steel rope, to obtain an elastic modulus $E=150$ GPa of the steel rope, a yield strength being $\sigma_y=1770$ MPa, an ultimate strength being $\sigma_b=1850$ MPa, a maximum plastic strain being $\varepsilon^p=0.05$. A tension-displacement curve of a ring chain is obtained through the test of the ring chain, to extract an initial length $l_{N0}=0.9$ m of the ring chain, a length $l_{N1}=1.327$ m at a bent boundary moment, a tension $F_{N1}=11.011$ kN, a development degree of the axial stress $\gamma_{N1}=0.063$, a length $l_{N2}=1.403$ m at a breaking moment, a tension $F_{N2}=73.410$ kN, and a development degree of the axial stress $\gamma_{N2}=0.419$. As shown in FIGS. 1, 2 and 4, the change of an axial tensile rigidity in the ring chain stretching process features two stages, the steel rope ring chain is equivalent to fiber deformation, and rigidities at the two stages respectively are $$\begin{cases} E_{f1} = \dfrac{11.011 \times 0.9}{2 \times 4.948 \times 10^{-5} \times (1.327 - 0.9)} = 234.520 \ MPa, & 0 < \gamma_N \leq \gamma_{N1} \\ E_{f2} = \dfrac{(73.410 - 11.011) \times 0.9}{2 \times 4.948 \times 10^{-5} \times (1.403 - 1.327)} = 7523.068 \ MPa, & \gamma_{N1} < \gamma_N \leq \gamma_{N2} \end{cases}$$

The damage criterion when the puncturing occurs in the ring net panel is obtained simultaneously, that is, the development degree of the maximum axial stress of the net ring in a force transmission path of the loaded region edge of the ring net panel is as follows:

$$\gamma_{Nmax} = \frac{\sigma_{N2}}{\sigma_y} = 0.40$$

Step (2): an equivalent calculation model of the ring net panel based on a fiber-spring unit is established.

A Cartesian coordinate system (xyz) is selected as a standard coordinate system of the model. h is a rising height of a top of the loaded end. The net ring in the loaded region presents a rectangle after the deformation ($a_x$ is a side length in an x direction, $a_y$ is a side length in a y direction), and axial deformation of the net ring is ignored, then $$\begin{cases} a_x + a_y = 0.3\pi/2 \\ a_x/a_y = 1 \end{cases} \Rightarrow a_x = a_y = 0.2356m$$

The calculation model presents a biaxial symmetry, the net ring of the loaded region is straightened and intersects with an edge of the heading end having a spherical crown shape, a side length of the ring net panel in a positive half axis direction of an axis x is $w_x$, intersection points at intervals of $_ax$ are marked as $P_1, P_2 \ldots P_i \ldots P_m$, and intersection points at intervals of $w_x/(2m+1)$ of the corresponding boundary are marked as $Q_1, Q_2 \ldots Q_i \ldots Q_m$, wherein i=1, 2, ... m, a calculation formula of an upper limit m taken by i is $$m = \text{round}\left(\frac{0.5}{0.2356}\right) = 2$$

a coordinate of a point $P_1$ of the edge of the loaded region is:

$$\begin{cases} x_P[1] = 0.2356 \times (1 - 1/2) = 0.1178m \\ y_P[1] = \sqrt{0.5^2 - 0.2356^2 \times (1 - 1/2)^2} = 0.4859m \\ z_P[1] = z \end{cases}$$

a coordinate of a point $Q_1$ of the boundary position may be represented as:

$$\begin{cases} x_Q[1] = 2.95 \times (1 - 1/2)/(2 \times 2 + 1) = 0.295m \\ y_Q[1] = 2.95/2 = 1.475m \\ z_Q[1] = 0 \end{cases}$$

a coordinate of a point $P_2$ of the edge of the loaded region is:

$$\begin{cases} x_P[2] = 0.2356 \times (2 - 1/2) = 0.3534m \\ y_P[2] = \sqrt{0.5^2 - 0.2356^2 \times (2 - 1/2)^2} = 0.3537m \\ z_P[2] = z \end{cases}$$

a coordinate of a point at $Q_2$ of the boundary may be represented a:

$$\begin{cases} x_Q[2] = 2.95 \times (2 - 1/2)/(2 \times 2 + 1) = 0.885m \\ y_Q[2] = 2.95/2 = 1.475m \\ z_Q[2] = 0 \end{cases}$$

a position vector matrix of a fiber-spring unit connecting $P_i$ and $Q_i$ may be represented as $$PQ = \begin{bmatrix} 0.1772 & 0.9891 & -z \\ 0.3516 & 1.1213 & -z \end{bmatrix}^T$$

at any moment, a length value of each fiber-spring unit:

$$L[1] = \sqrt{0.1772^2 + 0.9891^2 + z^2}$$

$$L[2] = \sqrt{0.3516^2 + 1.1213^2 + z^2}$$

at an initial moment z=0, a length value $L_0[i]$ of each fiber-spring unit is:

$$L_0[1] = \sqrt{0.1772^2 + 0.9891^2 + z^2}|_{z=0} = 1.0048 \text{ m}$$

$$L_0[2] = \sqrt{0.3516^2 + 1.1213^2 + z^2}|_{z=0} = 1.2409 \text{ m}$$

at any moment, a fiber length $l_f$ and a spring length $l_s$ in the $i^{th}$ unit (i=1, 2) respectively are (a) $0 < \gamma_N \leq \gamma_{N1}$ $$\begin{cases} l_s[1] = \dfrac{E_{f1}A(L[1] - l_{f0}[1]) + k_s l_{s0} l_{f0}[1]}{k_s l_{f0}[i] + E_{f1}A} \\ l_f[1] = \dfrac{k_s l_{f0}[1](L[1] - l_{s0}) + E_{f1}A l_{f0}[1]}{k_s l_{f0}[1] + E_{f1}A} \end{cases}$$

(b) $\gamma_{N1} < \gamma_N \leq \gamma_{N2}$ $$\begin{cases} l_s[1] = \dfrac{E_{f2}A/l_{f0}[1](L[1] - l_{f1}[1]) + k_s l_{s1}[1]}{k_s + E_{f2}A/l_{f0}[1]} \\ l_f[1] = \dfrac{k_s(L[1] - l_{s1}[1]) + l_{f1}[1] E_{f2}A/l_{f0}[1]}{k_s + E_{f2}A/l_{f0}[1]} \end{cases}$$

wherein $l_{f1}$ and $l_{s1}$ respectively are the fiber and spring lengths when $\gamma_N = \gamma_{N1}$.

The boundary spring is connected to the equivalent fiber in series, combination rigidities of the first (i=1) fiber-spring unit at two stages respectively are $$\begin{cases} K_1[1] = 1/[l_{f0}[1]/(E_{f1}A) + 1/k_s] = 12.141 \text{ kN/m}, & 0 < \gamma_N \leq \gamma_{N1} \\ K_2[1] = 1/[l_{f0}[1]/(E_{f2}A) + 1/k_s] = 389.854 \text{ kN/m}, & \gamma_{N1} < \gamma_N \leq \gamma_{N2} \end{cases}$$

combination rigidities of the second (i=2) fiber-spring unit at two stages respectively are $$\begin{cases} K_1[2] = 1/[l_{f0}[2]/(E_{f1}A) + 1/k_s] = 9.733 \text{ kN/m}, & 0 < \gamma_N \leq \gamma_{N1} \\ K_2[2] = 1/[l_{f0}[2]/(E_{f2}A) + 1/k_s] = 312.561 \text{ kN/m}, & \gamma_{N1} < \gamma_N \leq \gamma_{N2} \end{cases}$$

at any moment, an internal force value of the $i^{th}$ fiber-spring unit (i=1, 2) is as follows:

$$F[i] = \begin{cases} K_1[i](L[i]-L_0[i]), & 0 < \gamma_N \le \gamma_{N1} \\ K_1[i](L_1[i]-L_0[i]) + K_2[i](L[i]-L_1[i]), & \gamma_{N1} < \gamma_N \le \gamma_{N2} \end{cases}$$

at any moment, an energy value of the i fiber-spring unit i=1, 2 dissipated in the loading process is as follows:

$$E[i] = \begin{cases} K_1[i](L[i]-L_0[i])^2/2, & 0 < \gamma_N \le \gamma_{N1} \\ K_1L[i](L_1[i]-L_0[i]) + K_1(L_0^2[i]-L_1^2[i])/ \\ \qquad 2 + K_2(L[i]-L_1[i])^2/2 \end{cases}, \gamma_{N1} < \gamma_N \le \gamma_{N2}$$

a length of the ring net panel in a positive half axis of an axis y is marked as $w_0$, intersection points at intervals of $w_0/(2m+1)$ are marked as $C_1, C_2 \ldots C_j \ldots C_n$, intersection points of the corresponding boundary are marked as $D_1, D_2 \ldots D_j \ldots D_n$. Similarly, coordinates of points $C_j$ and $D_j$ of the edge of the loaded region, a total length $L[j]$ of the unit, an internal force value $F[j]$ of each unit, and energy dissipating $E[j]$ at any moment may all be obtained from symmetry.

step (3): calculating a puncturing displacement, a puncturing load and energy dissipating of the ring net panel.

In the displacement loading process of the ring net panel, when an invalidation occurs in any fiber-spring unit of the calculation model, the ring net panel is damaged, that is, a condition that damage occurs in the ring net panel is:

$$\max\{|F[i]|,|F[j]|\} = \frac{0.419 \times 1770 \times 7 \times \pi \times 3^2}{4} = 36.696 \text{ kN}$$

a unit having a minimum length in the model is $$L_0|_{i=1} = \min\{L_0[i],L_0[j]\} = 1.005 \text{ m}$$

that is, as for loading the displacement outside a specific surface, the internal force of the unit (i=1) develops fastest, and the unit (i=1) is first damaged $$F1|_{i=1} = \gamma_{N2}\sigma_y A = 36.396 \text{ kN}$$

Thus, the length of the first damaged unit is $$L_{max}|_{i=1} = 1.005 + 1770 \times 49.48 \times \left(\frac{0.063}{12140} + \frac{0.149-0.063}{389854}\right) = 1.539 \text{ m}$$

A length $L_0$ of the fiber-spring unit at a moment of z=0, a length $L_{max}$ of the unit at a moment of z=H and a height H of the loaded region at this time form a right triangle. According to the Pythagorean theorem, the puncturing displacement (a height of the loaded region) is $$H = z = \sqrt{1.539^2 - 1.005^2} = 1.165 \text{ m}$$

When the puncturing occurs in the ring net panel, z=1.165 is substituted into the equation of F[i]:

$$F[1] = K_1[1](L_1[1]-L_0[1]) + K_2[1](L[1]-L_1[1]) = 36.705 \text{ kN}$$

$$F[2] = K_1[2](L_1[2]-L_0[2]) + K_2[2](L[2]-L_1[2]) = 26.283 \text{ kN}$$

z=1.165 is substituted into the equation of E[i]:

$$E[1] = K_1L(L_1[1]-L_0[1]) + \frac{K_1(L_0^2[1]-L_1^2[1])}{2} + \frac{K_2(L[1]-L_1[1])^2}{2} = 2.937 \text{ kJ} \quad [2]$$

$$E[2] = K_1L[2](L_1[2]-L_0[2]) + \frac{K_1(L_0^2[2]-L_1^2[2])}{2} + \frac{K_2(L[2]-L_1[2])^2}{2} = 1.819 \text{ kJ}$$

a vector F[i] and F[j] of the internal force of the fiber-spring unit in x and y directions and an energy E[i] and E[j] dissipated by the unit may be obtained through the symmetry, wherein F[i]=F[j], and E[i]=E[j]. All force vectors are projected toward a vertical direction, and considering the symmetry, a puncturing force of the ring net panel is as follows:

$$F = 4\left\{\sum_{i=1}^{m} \frac{F[i]h}{L[i]} + \sum_{j=1}^{n} \frac{F[j]h}{L[j]}\right\} = 366.247 \text{ kN}$$

all energy dissipated by the fiber-spring unit is accumulated to obtain the dissipated energy of the ring net as follows:

$$E = 4\left\{\sum_{i=1}^{m} E[i] + \sum_{j=1}^{n} E[j]\right\} = 38.050 \text{ kJ}$$

When the ring net panels in the passive flexible protection net are connected by aluminum-alloy swaged ferrules, it should comply with the provision of "Aluminum-alloy swaged ferrules for steel wire rope" GB/T 6946-2008. When the ring net panels are connected by the shackle, it should comply with the provision of "Forged shackles for general lifting purposes-Dee shackles and bow shackles" GB/T 25854-2010.

The above embodiments are only used to explain the technical solutions of the present invention, rather than limiting them. Although the present invention is specifically explained referring to the previous embodiments, those ordinary technical persons in the art should understand that they still may amend the technical solutions recorded in the previous respective embodiments, or perform equivalent replacements for partial technical features therein. These amendments or replacements do not make the nature of the corresponding technical solutions depart from the spirits and scopes of the technical solutions of the respective embodiments of the present invention.

What is claimed is:

1. A method of a quantitative analysis and a design of a reliable flexible protection net by determining a limit load, a deformation, and an energy dissipating of the flexible protection net to meet safety protection requirements, wherein the flexible protection net comprises a ring net panel and a support part, wherein the support part has a protection structure, wherein the ring net panel is connected to the support part through a shackle and a steel rope, and wherein the ring net panel is a nesting of a plurality of single rings, the method comprising:

step (1): determining geometrical parameters of the ring net panel, the nested net ring, and the steel rope, wherein an inner diameter of each single ring of the plurality of single rings is d, each single ring is manufactured by winding the steel rope having a diameter of $d_{min}$ to form different numbers of turns $n_w$, and a cross-sectional area of the single ring it A $$A = \frac{n_w \pi d_{min}^2}{4};$$

the ring net panel has a length $w_x$ and a width $w_y$, a four-nested-into-one ring net panel is formed by using a minimum steel rope having a total length of $l_{wire}$ $$l_{wire} = \frac{n_w \pi d}{2\sqrt{2} d}[(w_x - d + 2\sqrt{2} d)(w_y - d + 2\sqrt{2} d) + (w_x - d)(w_y - d)];$$

the four-nested-into-one ring net panel is formed by the minimum steel rope having a total mass of $m_{wire}$;

step (2): establishing an equivalent calculation model of the ring net panel based on a fiber spring, wherein a Cartesian coordinate system is selected as a standard coordinate system of the equivalent calculation model, h is a rising height of a loading heading end, a net ring in a loaded region is rectangular after deformation, $a_x$ is a side length of the net ring in an x direction, $a_y$ is a side length of the net ring in a y direction, and axial deformation of the net ring is ignored, then $$\begin{cases} a_1 + a_2 = \pi d/2 \\ a_1/a_2 = w_2/w_1 \end{cases};$$

the equivalent calculation model presents a biaxial symmetry, the net ring of the loaded region is straightened and intersects with an edge of the loading heading end having a spherical crown shape, a side length of the ring net panel in a positive half axis direction of an axis x is $w_x$, first intersection points at intervals of $a_x$ are marked as $P_1, P_2 \ldots P_i \ldots P_m$, and second intersection points at intervals of $w_x/(2m+1)$ of a boundary corresponding to the side length of the ring net panel are marked as $Q_1, Q_2 \ldots Q_i \ldots Q_m$, and at any moment, a coordinate of a point $P_i$ of an edge of the loaded region is:

$$\begin{cases} x_P[i] = a_x(i - 1/2) \\ y_P[i] = \sqrt{R_p^2 - a_x^2(i - 1/2)^2} \\ z_P[i] = z \end{cases} \text{ and } \begin{cases} x_P[i] \geq 0 \\ y_P[i] \geq 0 \\ z_P[i] \geq 0 \end{cases};$$

a coordinate of a point $Q_i$ at the boundary is:

$$\begin{cases} x_Q[i] = w_x(i - 1/2)/(2m_x + 1) \\ y_Q[i] = w_y/2 \\ z_Q[i] = 0 \end{cases} \text{ and } \begin{cases} x_Q[i] \geq 0 \\ y_Q[i] \geq 0 \\ z_Q[i] \geq 0 \end{cases};$$

wherein i=1, 2, ... m, m is an upper limit of i;
a position vector direction of the fiber spring connecting the point $P_i$ and the point $Q_i$ is represented as the following equation:

$$PQ = (x_Q[i] - x_P[i], y_Q[i] - y_P[i], -z)$$

in a loading process, a length value of a $i^{th}$ fiber spring is:

$$L[i] = |PQ|, L_0[i] = |PQ|_{z=0};$$

wherein $L_0[i]$ is an initial length of the $i^{th}$ fiber spring;
at any moment, a fiber length $l_f$ and a spring length $l_s$ in the $i^{th}$ fiber spring respectively are:

$$(a) 0 < \gamma_N \leq \gamma_{N1} \begin{cases} l_s[i] = \frac{E_{f1} A(L[i] - l_{f0}[i]) + k_s l_{s0} l_{f0}[i]}{k_s l_{f0}[i] + E_{f1} A} \\ l_f[i] = \frac{k_s l_{f0}[i](L[i] - l_{f0}) + E_{f1} A l_{f0}[i]}{k_s l_{f0}[i] + E_{f1} A} \end{cases};$$

$$(b) \gamma_{N1} < \gamma_N \leq \gamma_{N2} \begin{cases} l_s[i] = \frac{E_{f2} A / l_{f0}[i](L[i] - l_{f1}[i]) + k_s l_{s1}[i]}{k_s + E_{f2} A / l_{f0}[i]} \\ l_f[i] = \frac{k_s(L[i] - l_{s1}[i]) + l_{f1}[i] E_{f2} A / l_{f0}[i]}{k_s + E_{f2} A / l_{f0}[i]} \end{cases};$$

wherein $l_{f1}$ is the fiber length; $l_{s1}$ is the spring length when $\gamma_N = \gamma_{N1}$; $\gamma_N$ is a development degree of an axial stress; $\gamma_{N1}$ is a development degree of a first axial stress $\sigma_{N1}$; and $\gamma_{N2}$ is a development degree of a second axial stress $\sigma_{N2}$;

at any moment, an internal force value of the $i^{th}$ fiber spring $$F[i] = \begin{cases} K_1[i](L[i] - L_0[i]), & 0 < \gamma_N \leq \gamma_{N1} \\ K_1[i](L_1[i] - L_0[i]) + K_2[i](L[i] - L_1[i]), & \gamma_{N1} < \gamma_N \leq \gamma_{N2} \end{cases};$$

at any moment, an energy value of the $i^{th}$ fiber spring dissipated in the loading process $$E[i] = \begin{cases} K_1[i](L[i] - L_0[i])^2/2, & 0 < \gamma_N \leq \gamma_{N1} \\ K_1 L[i](L_1[i] - L_0[i]) + K_1(L_0^2[i] - L_1^2[i])/2 + & \gamma_{N1} < \gamma_N \leq \gamma_{N2} \\ K_2(L[i] - L_1[i])^2/2, & \end{cases};$$

a length of the ring net panel in a positive half axis of an axis y is marked as $w_y$, third intersection points at intervals of $w_y/(2n+1)$ are marked as $C_1, C_2 \ldots C_j \ldots C_n$, fourth intersection points of the boundary corresponding to the length of the ring net panel are marked as $D_1, D_2 \ldots D_j \ldots D_n$; similarly, coordinates of points $C_j$ and $D_j$ of the edge of the loaded region, a total length $L[j]$ of the $j^h$ fiber spring, the internal force value $F[j]$ of the $j^h$ fiber spring, and an energy dissipating $E[j]$ at any moment are obtained from symmetry;

step (3): calculating a puncturing displacement, a puncturing load and the energy dissipating of the ring net, wherein in a displacement process and the loading process of the ring net panel, when an invalidation occurs in any fiber spring of the equivalent calculation model, the ring net panel is damaged, a damage occurrence condition the ring net panel is:

$$\max\{|F[i]|, |F[j]|\} = \frac{\gamma_{Nmax} \sigma_y n_w \pi d_{min}^2}{4}, \text{ and}$$

step (4): designing the reliable flexible protection net to improve the performance of the net in interception effect using the parameters calculated in previous steps that satisfy safety protection requirements.

2. The method according to claim 1, wherein, after step (1), the method further comprises:
step (A): determining a loading rate, the loaded region and a boundary condition of the ring net panel, wherein according to the geometrical parameters of the ring net panel in step (1), whether the loading rate applied to the ring net panel satisfies a quasi-static loading requirement is further determined;
whether a size of the loaded region satisfies a protection condition is judged; and
whether a boundary of the ring net panel is a hinged boundary or an elastic boundary is judged.

3. The method according to claim 2, wherein the loading rate in the step (A) is a moving speed of the loading heading end having the spherical crown shape in a direction vertical to a net surface of the ring net panel, and the loading rate satisfies the quasi-static loading requirement, wherein, the quasi-static loading requirement is that a vertical loading rate of the loading heading end is smaller than 10 mm/s;
the loading heading end having the spherical crown shape directly comes in contact with the ring net panel at the loaded region, and the size of the loaded region satisfies the protection condition, wherein, the protection condition is that a diameter D of a maximum loaded region is smaller than 1/3 of a size of the ring net panel in a shortest direction Minimum$\{w_x, w_y\}$;
the boundary of the ring net panel comprises the hinged boundary or the elastic boundary, if the boundary of the ring net panel is the elastic boundary, an equivalent stiffness of the boundary is $k_s$=const, and if the boundary of the ring net panel is the hinged boundary, an equivalent stiffness of the boundary is $k_s$=∞.

4. The method according to claim 2, wherein, after step (A), the method further comprises:
step (B): obtaining basic mechanical parameters of materials through tests, and establishing a critical damage criterion of the ring net panel, wherein
the steel rope and a steel rope net ring consistent with the geometrical parameters in step (1) are selected to respectively conduct a tensile test of the steel rope and a breaking test of a three-ring ring chain; a stress-strain curve of the ring net panel material is obtained through the tensile test of the steel rope, to extract material parameters such as an elastic modulus E, a yield strength $\sigma_y$, an ultimate strength $\sigma_b$, a maximum plastic strain $\varepsilon^p$, etc.; a tension-displacement curve of a ring chain is obtained through the breaking test of the three-ring ring chain, to extract an initial length $l_{N0}$ of the ring chain, a length $l_{N1}$ at a bent boundary moment, a tension $F_{N1}$, a length $l_{N2}$ at a breaking moment, and a tension $F_{N2}$; the critical damage criterion when puncturing occurs in the ring net panel is obtained, wherein, the critical damage criterion is that the development degree of a maximum axial stress of the net ring in a force transmission path of the edge of the loaded region of the ring net panel is:

$$\gamma_{Nmax} = \gamma_{N2} = \frac{\sigma_{N2}}{\sigma_y} = \frac{F_{N2}}{(2\sigma_y A)}.$$

5. The method according to claim 1, wherein, step (3) further comprises:
when a rising height of the loading heading end is z, as i increases (i=1, 2, 3, . . . ), an initial length $L_0[i]$ of the fiber spring increases, while an axial force F[i] of the fiber spring reduces, $L_0[i]<L_0[i+1] \Rightarrow F[i+1]<F[i]$;

the fiber spring having a minimum length in the equivalent calculation model is $L_0|_{i=1}=\min\{L_0[i],L_0[j]\}$;

when a displacement is loaded outside a specific surface, an internal force of the fiber spring (i=1) develops fastest, and the fiber spring (i=1) is first damaged $F|_{i=1}=\gamma_{N2}\sigma_y A$;

a length of the fiber spring first damaged is $$L_{max}|_{i=1} = L_0 + \sigma_y A\left(\frac{\gamma_{N1}}{K_1|_{i=1}} + \frac{\gamma_{N2}-\gamma_{N1}}{K_2|_{i=1}}\right);$$

a length $L_0$ of the fiber spring at a moment of z=0, a length $L_{max}$ of the fiber spring at a moment of z=H and a height H of the loaded region at the moment of z=H form a right triangle; according to the Pythagorean theorem, the puncturing displacement is $H=z=\sqrt{L_{max}^2|_{i=1}-L_0^2|_{i=1}}$ vectors F[i] and F[j] of the internal force of the fiber spring in x and y directions and energy E[i] and E[j] dissipated by the fiber spring are obtained through the symmetry, projecting all force vectors toward a vertical direction, and considering the symmetry, a puncturing force of the ring net panel is as follows:

$$F = 4\left\{\sum_{i=1}^{m}\frac{F[i]h}{L[i]} + \sum_{j=1}^{n}\frac{F[j]h}{L[j]}\right\};$$

all energy dissipated by the fiber spring are accumulated to obtain the dissipating energy of the ring net:

$E=4\{\Sigma_{i=1}^{m}E[i]+\Sigma_{j=1}^{n}E[j]\}$.

6. The method according to claim 1, wherein the equivalent calculation model of the ring net panel based on the fiber spring established in the step (2) is biaxially symmetrical, the net ring of the loaded region is straightened and intersects with an edge of the loading heading end having the spherical crown shape, the side length of the ring net panel in the positive half axis direction of the axis x is $w_x$, the first intersection points at intervals of $a_x$ are marked as $P_1$, $P_2 \ldots P_i \ldots P_m$, and the second intersection points at intervals of $w_y/(2m+1)$ of the boundary corresponding to the side length of the ring net panel are marked as $Q_1, Q_2 \ldots Q_i \ldots Q_m$, and at any moment, the coordinate of the point $P_i$ of the edge of the loaded region is:

$$\begin{cases} x_P[i] = a_x(i-1/2) \\ y_P[i] = \sqrt{R_p^2 - a_x^2(i-1/2)^2} \\ z_P[i] = z \end{cases} \text{and} \begin{cases} x_P[i] \geq 0 \\ y_P[i] \geq 0 \\ z_P[i] \geq 0 \end{cases};$$

the coordinate of the of point $Q_i$ at the boundary is:

$$\begin{cases} x_Q[i] = w_x(i-1/2)/(2m_x+1) \\ y_Q[i] = w_y/2 \\ z_Q[i] = 0 \end{cases} \text{and} \begin{cases} x_Q[i] \geq 0 \\ y_Q[i] \geq 0 \\ z_Q[i] \geq 0 \end{cases};$$

wherein i=1, 2, . . . m, m is the upper limit of i.

7. The method according to claim 5, wherein the puncturing displacement of the ring net panel in the step (3) is a difference between a height from the ground at a moment when the loading heading end having the spherical crown shape initially contacts the ring net panel and a height at a moment when puncturing damage occurs, the puncturing displacement depends on the deformation of the fiber spring in a shortest force transmission path of the ring net panel when the breaking occurs, and an equation of the puncturing displacement is:

$$H=z=\sqrt{L_{max}^2|_{i=1}-L_0^2|_{i=1}}.$$

8. The method according to claim 5, wherein the puncturing force of the ring net panel in the step (3) is a projected accumulation value of all vectors of the internal force of the fiber spring in a loading direction when the loading heading end having the spherical crown shape loads the ring net panel and puncturing damage occurs, and an equation is:

$$F = 4\left\{\sum_{i=1}^{m}\frac{F[i]h}{L[i]} + \sum_{j=1}^{n}\frac{F[j]h}{L[j]}\right\}.$$

9. The method according to claim 5 wherein the energy dissipated by the ring net panel in the step (3) is a sum of work done by all vectors of the internal force of the fiber spring in respective directions during the loading process from the initial moment to a puncturing moment, wherein the loading heading end having the spherical crown shape loads the ring net panel at the initial moment, and puncturing damage occurs in the ring net panel at the puncturing moment, and an equation is:

$$E=4\{\Sigma_{i=1}^{m}E[i]+\Sigma_{j=1}^{n}E[j]\}.$$

10. The method according to claim 1, wherein the steel rope having high strength in the step (1) is a basic material of manufacturing the ring net panel, a surface of the steel rope is plated with anti-corrosion coating, and a diameter $d_{min}$ of the steel rope is 2 mm-3 mm; the steel rope having high strength is formed to a single steel rope net ring having the inner diameter of d after winding a mold a certain number of turns, and the net ring is a basic unit of the ring net panel; the ring net panel is formed by nesting the plurality of single rings in a four-nested-into-one mode, and an external contour of the ring net panel is rectangular.

11. The method according to claim 3, wherein, after step (A), the method further comprises:
step (B): obtaining basic mechanical parameters of materials through tests, and establishing a critical damage criterion of the ring net panel, wherein
the steel rope and a steel rope net ring consistent with the geometrical parameters in step (1) are selected to respectively conduct a tensile test of the steel rope and a breaking test of a three-ring ring chain; a stress-strain curve of the ring net panel material is obtained through the tensile test of the steel rope, to extract material parameters such as an elastic modulus E, a yield strength $\sigma_y$, an ultimate strength $\sigma_b$, a maximum plastic strain $\varepsilon^p$, etc.; a tension-displacement curve of a ring chain is obtained through the breaking test of the three-ring ring chain, to extract an initial length $l_{N0}$ of the ring chain, a length $l_{N1}$ at a bent boundary moment, a tension $F_{N1}$, an axial stress $\sigma_{N1}$, a development degree of the axial stress $\gamma_{N1}$, a length $l_{N2}$ at a breaking moment, a tension $F_{N2}$, an axial stress $\sigma_{N2}$, and a development degree of the axial stress $\gamma_{N2}$; the critical damage criterion when puncturing occurs in the ring net panel is obtained, wherein, the critical damage criterion is that the development degree of a maximum axial stress of the net ring in a force transmission path of the edge of the loaded region of the ring net panel is:

$$\gamma_{Nmax} = \gamma_{N2} = \frac{\sigma_{N2}}{\sigma_y} = \frac{F_{N2}}{(2\sigma_y A)}.$$

12. The method according to claim 2, wherein the steel rope having high strength in the step (1) is a basic material of manufacturing the ring net panel, a surface of the steel rope is plated with anti-corrosion coating, and a diameter $d_{min}$ of the steel rope is 2 mm-3 mm; the steel rope having high strength is formed to a single steel rope net ring having the inner diameter of d after winding a mold a certain number of turns, and the net ring is a basic unit of the ring net panel; the ring net panel is formed by nesting the plurality of single rings in a four-nested-into-one mode, and an external contour of the ring net panel is rectangular.

13. The method according to claim 3, wherein the steel rope having high strength in the step (1) is a basic material of manufacturing the ring net panel, a surface of the steel rope is plated with anti-corrosion coating, and a diameter $d_{min}$ of the steel rope is 2 mm-3 mm; the steel rope having high strength is formed to a single steel rope net ring having the inner diameter of d after winding a mold a certain number of turns, and the net ring is a basic unit of the ring net panel; the ring net panel is formed by nesting the plurality of single rings in a four-nested-into-one mode, and an external contour of the ring net panel is rectangular.

14. The method according to claim 4, wherein the steel rope having high strength in the step (1) is a basic material of manufacturing the ring net panel, a surface of the steel rope is plated with anti-corrosion coating, and a diameter $d_{min}$ of the steel rope is 2 mm-3 mm; the steel rope having high strength is formed to a single steel rope net ring having the inner diameter of d after winding a mold a certain number of turns, and the net ring is a basic unit of the ring net panel; the ring net panel is formed by nesting the plurality of single rings in a four-nested-into-one mode, and an external contour of the ring net panel is rectangular.

15. The method according to claim 5, wherein the steel rope having high strength in the step (1) is a basic material of manufacturing the ring net panel, a surface of the steel rope is plated with anti-corrosion coating, and a diameter $d_{min}$ of the steel rope is 2 mm-3 mm; the steel rope having high strength is formed to a single steel rope net ring having the inner diameter of d after winding a mold a certain number of turns, and the net ring is a basic unit of the ring net panel; the ring net panel is formed by nesting the plurality of single rings in a four-nested-into-one mode, and an external contour of the ring net panel is rectangular.

16. The method according to claim 6, wherein the steel rope having high strength in the step (1) is a basic material of manufacturing the ring net panel, a surface of the steel rope is plated with anti-corrosion coating, and a diameter $d_{min}$ of the steel rope is 2 mm-3 mm; the steel rope having high strength is formed to a single steel rope net ring having the inner diameter of d after winding a mold a certain number of turns, and the net ring is a basic unit of the ring net panel; the ring net panel is formed by nesting the plurality of single rings in a four-nested-into-one mode, and an external contour of the ring net panel is rectangular.

17. The method according to claim 7, wherein the steel rope having high strength in the step (1) is a basic material of manufacturing the ring net panel, a surface of the steel rope is plated with anti-corrosion coating, and a diameter $d_{min}$ of the steel rope is 2 mm-3 mm; the steel rope having high strength is formed to a single steel rope net ring having the inner diameter of d after winding a mold a certain number of turns, and the net ring is a basic unit of the ring net panel; the ring net panel is formed by nesting the plurality of single rings in a four-nested-into-one mode, and an external contour of the ring net panel is rectangular.

18. The method according to claim 8, wherein the steel rope having high strength in the step (1) is a basic material of manufacturing the ring net panel, a surface of the steel rope is plated with anti-corrosion coating, and a diameter $d_{min}$ of the steel rope is 2 mm-3 mm; the steel rope having high strength is formed to a single steel rope net ring having the inner diameter of d after winding a mold a certain number of turns, and the net ring is a basic unit of the ring net panel; the ring net panel is formed by nesting the plurality of single rings in a four-nested-into-one mode, and an external contour of the ring net panel is rectangular.

19. The method according to claim 9, wherein the steel rope having high strength in the step (1) is a basic material of manufacturing the ring net panel, a surface of the steel rope is plated with anti-corrosion coating, and a diameter $d_{min}$ of the steel rope is 2 mm-3 mm; the steel rope having high strength is formed to a single steel rope net ring having the inner diameter of d after winding a mold a certain number of turns, and the net ring is a basic unit of the ring net panel; the ring net panel is formed by nesting the plurality of single rings in a four-nested-into-one mode, and an external contour of the ring net panel is rectangular.

* * * * *